United States Patent [19]

Lauer et al.

[11] 4,055,381
[45] Oct. 25, 1977

[54] CARD HOLDER

[75] Inventors: John B. Lauer; Betty Alma Wade, both of Houston, Tex.

[73] Assignee: John B. Lauer, Houston, Tex.

[21] Appl. No.: 647,100

[22] Filed: Jan. 7, 1976

[51] Int. Cl.² .................. G03B 27/62; A47F 7/00
[52] U.S. Cl. ........................... 355/75; 211/55; 354/292
[58] Field of Search ............. 40/10 D, 19.5, 104.03, 40/104.19, 106.1, 124, 124.2, 124.4, 156, 159; 355/75, 39, 64, 65, 54; 354/292; 211/55, 135, 128

[56] References Cited

U.S. PATENT DOCUMENTS

| 1,563,045 | 11/1925 | Schaffer | 354/292 X |
| 2,849,916 | 9/1958 | Nolan | 355/64 |
| 3,721,173 | 3/1973 | Jaffe | 355/75 X |

FOREIGN PATENT DOCUMENTS

| 1,084,264 | 7/1954 | France | 355/75 |

Primary Examiner—Richard A. Wintercorn
Attorney, Agent, or Firm—Hill, Gross, Simpson, Van Santen, Steadman, Chiara & Simpson

[57] ABSTRACT

A holder made of clear plastic appropriately sized for use in an office copier is made with prealigned holding pockets to contain one or more specifically sized card-type documents. A set of cards is inserted into the pockets and held in a manner such that data on the cards can be reproduced in the copier.

1 Claim, 10 Drawing Figures

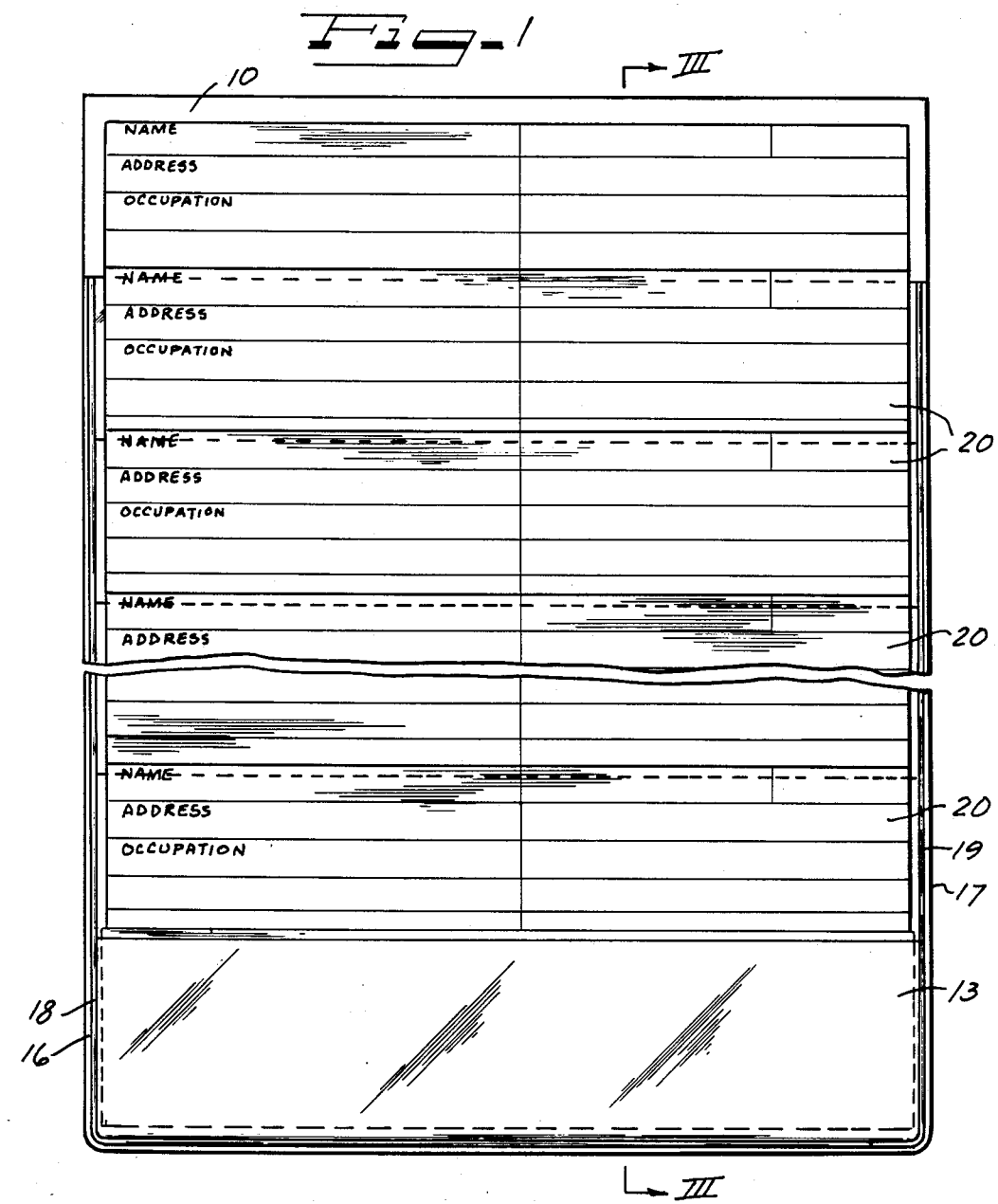
Fig. 1
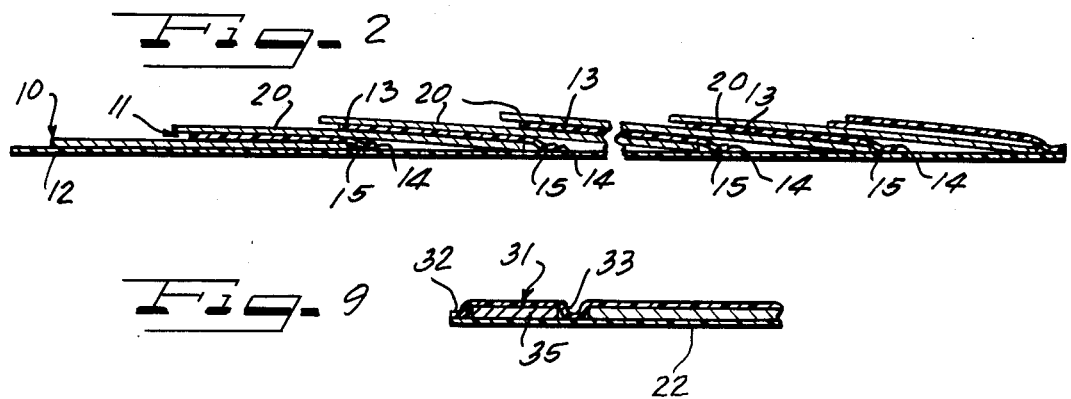
Fig. 2
Fig. 9

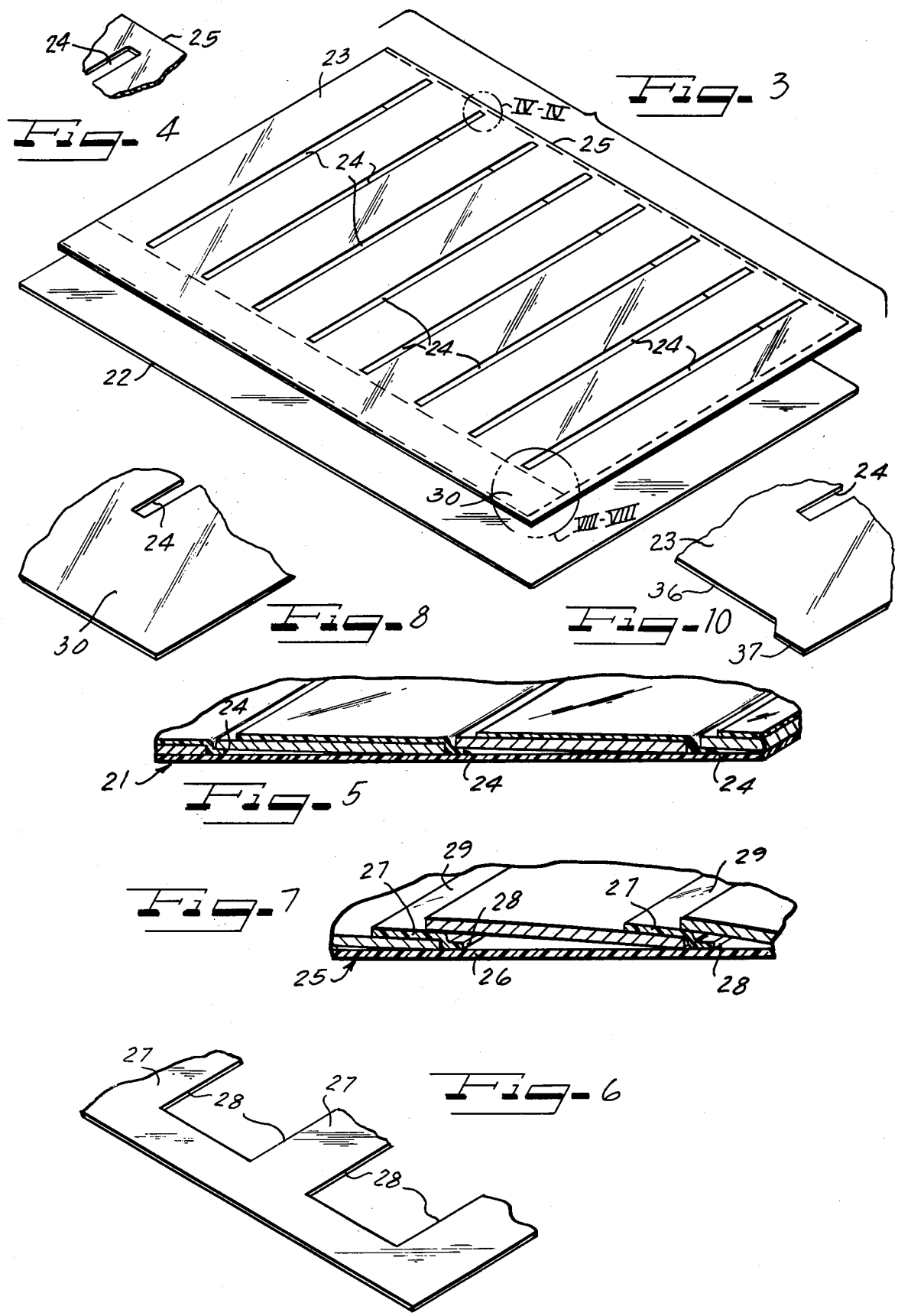

CARD HOLDER

BACKGROUND OF THE INVENTION

1. Field of Invention

This invention relates generally to holding devices having individually sized holding pockets to secure card-type documents such as informational cards, cancelled checks or a similar item within a pocket so that the data disclosed by the contained card can be conveniently copied in a modern office copying machine such as a xerographic copier, a microfilm copier or the like.

2. Description of Prior Art

Heretofore, the assembly of card-type documents such as informational cards, cancelled checks or other such smaller than letter size items for copying in a modern office copying machine was difficult and time consuming. Individual cards had to be assembled on a blank piece of paper by stapling or taping in order to facilitate copying of more than one item at a time. In other cases, individual cards were positioned on the copying surface of the copier before reproduction could begin. Such assembling was time consuming for the user as well as for the copying machine. This assembly work was particularly cumbersome where a certain portion of a card was not to be reproduced and therefore required covering.

SUMMARY OF THE INVENTION

In accordance with this invention, a holder is made having a backing sheet made of a suitable material such as a clear vinyl plastic. A front sheet is prepared with a series of horizontal openings or cutouts within an portion of the front sheet inwardly from its margins. The two sheets are then aligned and a series of pockets of predetermined size created by selectively heat seaming the two sheets.

Using the above noted manufacturing procedure, a limitless combination of pocket sizes can be created to hold such material as data processing cards, cancelled checks or other informational cards. The pockets can be arranged to provide complete exposure of the contained card or limit exposure by having the top of one card overlap the bottom of an adjacent upper card. By so overlapping, the holder can contain a greater number of such cards as well as limit exposure to a preselected area on the cards.

A full length vertical or horizontal pocket also can be formed to hold an identification means for numbering or otherwise indexing rows or columns with respect to the inserted material.

With the cards so inserted in the respective pockets of the holder, the holder with its contained cards can be conveniently transferred to an office type copying machine where the informational material on the card can be readily reproduced.

BRIEF DESCRIPTION OF THE DRAWINGS

FIG. 1 is a fragmental front elevational view of an assembled holder into which cards have been inserted in an overlap array.

FIG. 2 is a fragmental vertical sectional view through the holder taken substantially along the line III—III in FIG. 1 depicting construction of the pockets.

FIG. 3 is an isometric view depicting a backing sheet and a front sheet in position to be assembled into a holder.

FIG. 4 is a fragmentary detail view of a portion of the right edge of the front sheet in the area IV—IV of FIG. 3.

FIG. 5 is a fragmentary sectional detail view of a holder assembled from the backing and front sheet of FIG. 3.

FIG. 6 is a fragmentary detail view of a front sheet having a modified cutout configuration.

FIG. 7 is a fragmentary sectional details view of a holder assembled from the front sheet of FIG. 6.

FIG. 8 is a fragmentary sectional detail view of the front sheet in the area VIII—VIII of FIG. 3 having a vertical row identification portion.

FIG. 9 is a fragmentary sectional detail view through a holder having a row identification pocket; and FIG. 10 is a fragmentary detail view of a front sheet having a modified vertical row identification portion.

DETAILED DESCRIPTION OF THE INVENTION

A holder, as embodied in this invention, overcomes a major drawback if using a card-type document of a lesser size then the normal letter ($8\frac{1}{2} \times 11$ inches) in that data recorded on such a card can now be conveniently or efficiently reproduced in a modern office copying machine, i.e., an electrostatic copier, microfilm copier, etc,. Since a holder can be made having a near limitless number of pocket sizes and pocket arrangements, the holder also can be used to contain such documents as data processing cards and cancelled checks.

A holder 10, as shown in FIGS. 1 and 2, is made of a flexible thermoplastic sheet-form material such as clear vinyl plastic. In the holder 10, a set of pockets 11 is formed using a backing sheet 12 and a series of overlapping flaps 13 which are individually heat seamed along a bottom edge 14 of the flap 13 to form a joint or a seam 15. The formation of the pockets 11 is completed by heat seaming along a left and right vertical edge 16/17 to form seams 18/19.

Although the present invention is of general utility wherever it is desirable to handle flat card-like informational vehicles, a particularly useful application is found as applied to so called juror cards wherein material and information must be copied and recorded.

The pockets 11 of the holder 10 are particularly suited for having inserted therein a set of cards 20 containing personal data of prospective jurors. Each card 20 is divided into an upper and lower portion wherein the lower portion contains data considered confidential. Because of the overlapping array, the confidential portion is covered by the upper portion of the adjacent lower card. The holder 10 provides a convenient and quick means by which the non-confidential data on the upper portion of the card 20 can be efficiently reproduced in a modern office copier.

The use of a flexible thermoplastic material such as vinyl, makes a most ideal front and backing sheet since it is available in a clear or opaque form and can be easily prepared with custom shaped cutouts or openings. This material can be easily fused by heat to form seams as required.

A holder 21, as shown in FIG. 3 and FIG. 5, is assembled from a solid backing sheet 22 and a solid front sheet 23 which has been prepared having a series of horizontal openings 24. To facilitate handling of the front sheet 23, the openings 24 are not full width but stop within a fraction of an inch of a right outer edge 25 so that the front sheet 23 remains in one piece.

By using this construction, assembly of the holder 21 is less time consuming since the front sheet 23 and the backing sheet 22 can be fused to form a series of seams 24 in one step. Note that this construction is different from that of the holder 10 as shown in FIGS. 1 and 2 since there each flap 13 must be individually seamed to the backing sheet 12 along the bottom edge 14.

As shown in FIG. 7, a holder 25 is formed having a backing sheet 26 and a front sheet 27 having a substantially larger opening 28 decreasing the height of a flap 29.

It should be noted that a one piece construction front sheet is also applicable to creating an overlap card array. Overlapping occurs any time an inserted card exceeds the height of a containing pocket.

As shown in FIG. 3, the front sheet 23 is prepared having a vertical left hand integral material portion 30. By providing this portion 30, a vertical row identification pocket 31 can be formed by fusing a left vertical seam 32 (FIG. 9), a right vertical seam 33 and a bottom seam (not shown). Into this pocket 31 can be inserted a row identification strip 35 for indexing inserted cards. A like horizontal pocket along the top horizontal edge also can be formed to contain a column identification strip.

When the row or column identification pocket 31 is long and narrow, it is desirable not to have a full height seam 32, but only a partial seam. As shown in FIG. 10, this is accomplished by removing a small material portion to create a cutout 36 and an offset portion 37. The seam 32 is formed only where the offset portion 37 and the backing sheet 22 are aligned and in contact along the edge. By providing only the partial seam 32, it is easier to insert or remove the index strip 35.

While various modifications may be suggested by those versed in the art, it should be appreciated that I wish to embody within the scope of the present patent warranted herein all such modifications as reasonably and properly come within the scope of my contribution to the art.

I claim as my invention:

1. A holder for supporting data carrying cards comprising:

a substantially rectangular backing sheet of fusible material, a front sheet substantially matching in size the backing sheet and also being made of fusible material, said front sheet having a series of horizontal vertically spaced slots formed therein alternating with a series of rectangular solid portions of said front sheet, said front sheet and said backing sheet being aligned and fused together along left and right vertical seams thereby leaving said slot substantially free, fused seams securing lower edges of said front sheet to said backing sheet leaving the upper slot edges of said front sheet free and forming upwardly opening pockets between said front sheet and said backing sheet with the lower edges of said pockets closed, whereby cards can be supported in the pockets with their lower edges supported along the lower closed edges of the pockets and with the upper portions of the cards projecting above the upper slot edges, a set of a cards of greater height than said pockets, one of said cards being engaged in each selected pocket, lower portions of each respective card being concealed by upper portions of cards projecting from lower pockets in which the overlapping cards are engaged, said front sheet being made of a clear transparent material, an opaque member engaged in the pocket of any card which does not have its lower portion overlappingly concealed by a card in a lower pocket, whereby confidential matter on the concealed portions of the card can be retained in confidence while non-confidential data on the upper portion of the cards can be reproduced in conventional office copiers, said front sheet having a vertical integral material portion at one vertical border thereof and being co-extensive with the vertical length thereof, right and left vertical seams fused on opposite sides of said integral material portion between said front sheet and said backing sheet to form a row identification pocket adjacent said other pockets for receiving a row identification strip, said front sheet having a horizontal integral material portion at one horizontal border thereof and being co-extensive with at least the horizontal length of said spaced slots, and upper and lower horizontal seams fused on opposite sides of said horizontal integral material portion to form a column identification pocket for receiving a column identification strip.

* * * * *